United States Patent
Nag et al.

(10) Patent No.: US 11,756,076 B2
(45) Date of Patent: Sep. 12, 2023

(54) SYSTEMS AND METHODS FOR PROVIDING SPONSORED RECOMMENDATIONS

(71) Applicant: Walmart Apollo, LLC, Bentonville, AR (US)

(72) Inventors: Kaushiki Nag, Sunnyvale, CA (US); Kannan Achan, Saratoga, CA (US); Lalitesh Morishetti, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 204 days.

(21) Appl. No.: 17/187,507

(22) Filed: Feb. 26, 2021

(65) Prior Publication Data

US 2022/0277345 A1    Sep. 1, 2022

(51) Int. Cl.
*G06Q 30/0251*    (2023.01)
*G06N 5/04*    (2023.01)
*G06N 20/00*    (2019.01)

(52) U.S. Cl.
CPC .......... *G06Q 30/0254* (2013.01); *G06N 5/04* (2013.01); *G06N 20/00* (2019.01)

(58) Field of Classification Search
CPC ...... G06Q 30/0254; G06N 5/04; G06N 20/00; G06N 3/08
See application file for complete search history.

(56) References Cited

U.S. PATENT DOCUMENTS

| 8,655,727 B2 * | 2/2014 | Scholl | G06Q 30/02 |
| | | | 705/14.54 |
| 10,664,875 B2 | 5/2020 | Doshi et al. | |
| 2007/0028263 A1 * | 2/2007 | Collins | G06Q 30/0243 |
| | | | 725/35 |
| 2008/0046316 A1 * | 2/2008 | Shah | G06Q 30/02 |
| | | | 705/14.46 |
| 2011/0238486 A1 * | 9/2011 | Liu | G06Q 30/0244 |
| | | | 705/14.42 |

(Continued)

FOREIGN PATENT DOCUMENTS

AU    2015202179 A1 *    5/2015

OTHER PUBLICATIONS

Marvin, Borislav et al., "Deep Reinforcement Learning with Decorrelation", arXiv:1903.07765v3, May 8, 2019 13 pages.

(Continued)

*Primary Examiner* — Alexandru Cirnu
(74) *Attorney, Agent, or Firm* — Morgan, Lewis & Bockius LLP; Manita Rawat

(57) ABSTRACT

This application relates to apparatus and methods for automatically determining and providing digital recommendations including sponsored items at optimized positions. In some examples, a computing device receives a recommendation request. In response, the computing device obtains a plurality of items based on the user data. The plurality of items includes a plurality of relevant items and a plurality of sponsored items. The computing device then determines a total profit for a combination of the plurality of items by injecting the plurality of promotional items at different position amongst the plurality of relevant items. The plurality of items are presented to the user based at least in part on the total profit and the corresponding combination.

20 Claims, 6 Drawing Sheets

(56) References Cited

U.S. PATENT DOCUMENTS

| | | | | |
|---|---|---|---|---|
| 2011/0270672 A1* | 11/2011 | Hillard | ............... | G06Q 30/0246 |
| | | | | 705/14.42 |
| 2014/0379464 A1* | 12/2014 | Aronowich | ........ | G06Q 30/0244 |
| | | | | 705/14.48 |
| 2019/0295126 A1* | 9/2019 | Madden | .............. | G06F 16/9535 |
| 2019/0342595 A1* | 11/2019 | Ramani | .............. | G06Q 30/0249 |
| 2020/0265305 A1 | 8/2020 | Budden et al. | | |

OTHER PUBLICATIONS

Zhao, Xiangyu et al., "Deep Reinforcement Learning for Online Advertising in Recommender Systems", arXiv:1909.03602v1, Sep. 9, 2019, 10 pages.

* cited by examiner

SYSTEMS AND METHODS FOR PROVIDING SPONSORED RECOMMENDATIONS

TECHNICAL FIELD

The disclosure relates generally to digital recommendations and, more specifically, to electronically determining and providing digital recommendations including sponsored items.

BACKGROUND

At least some websites, such as retailer websites (e.g., e-commerce platforms), display item recommendations including relevant and sponsored items (e.g., advertisements). For example, a website may display item recommendations, and may further allow a customer to purchase recommended items. The displayed recommendations may be determined by recommendation systems, which may attempt to provide recommendations for items which the customer may be interested in. Some websites provide sponsored items as recommendations in fixed positions, in a global and static manner, for all user, for all transactions. For example, some websites provide sponsored items at the beginning and/or top of the page prior to other item recommendations determined based on relevancy (e.g., relevant items). Some websites limit a total number of item recommendations per page, and within that limit a total number of sponsored items that can be presented to a user. Some websites use carousels and corresponding panes to organize the item recommendations based on page limits. For example, a pane may include a set number of item recommendations within a carousel, and a page may have a set number of overall item recommendations. In an example, a featured items carousel may include a set number of sponsored items at the beginning of the carousel. However, presenting sponsored items in fixed positions without optimizing for relevancy and potential profit may lead to a decreased overall revenue when other items that the user is more likely to purchase could have been presented in more optimal, easy to notice positions. In this way, in some examples, the item recommendation systems may provide recommendations for items that the customer finds irrelevant or is not interested in at positions that the user is most likely to interact with, losing out on revenue that may have been collected with other more relevant items recommended in those positions. In some examples, the customer may even be embarrassed by a displayed recommendation.

As a result, a retailer may lose sales of items to a customer. For example, the customer may not buy the recommended item, such as a presented sponsored item. In addition, the customer may leave the website without having purchased an item that, if shown a recommendation for, the customer would have purchased. In some examples, if a customer perceives a recommendation as irrelevant or embarrassing, the customer may go elsewhere, such as another website, to make purchases. As such, there are opportunities to address item recommendation systems, particularly related to the presentation of sponsored items in an optimized manner to maximize revenue from sale of sponsored items without compromising on relevancy of the recommendations.

SUMMARY

The embodiments described herein are directed to automatically determining and providing digital item recommendations with sponsored items at optimized positions for display, for example, on a website. The embodiments may allow a person, such as a customer, to be presented with item recommendations, including sponsored items and non-sponsored items, at optimized positions that may be more likely to interest the customer while simultaneously maximizing the total potential profit for the retailer. For example, the embodiments may allow the person to view recommendations with sponsored and non-sponsored items, at personalized positions, that the person may be more willing to purchase. In some examples, the embodiments may provide positioning processes that position sponsored and non-sponsored products in an efficient and accurate manner to increase sponsorship value while maintaining relevancy of the recommendations. The positioning processes may determine the items for recommendations and their corresponding positions based on relevancy scores, cost to click per sponsored items scores, and profit margins associated with each combination of relevant items and sponsored items. In some examples, the recommendations are personalized to each person, e.g., the order of items is personalized to each person. As a result, the embodiments may allow a retailer to present more relevant sponsored items and non-sponsored with item recommendations to each person in more relevant and more profitable positions, thereby increasing the potential revenue without compromising the probability that the person will purchase the recommended items. In addition, because a person may now spend less time reviewing irrelevant recommendations, the person may have additional time to consider additional items for purchase. Further, instead of randomly choosing sponsored items to recommend, recommending relevant sponsored items at optimized positions may increase revenue from sponsorships as well. In addition to or instead of these example advantages, persons of ordinary skill in the art having the benefit of these disclosures would recognize and appreciate other advantages as well.

In accordance with various embodiments, exemplary systems may be implemented in any suitable hardware or hardware and software, such as in any suitable computing device. For example, in some embodiments, a computing device is configured to obtain user data associated with a user from a database. The computing device is configured to obtain a plurality of items including a plurality of relevant items and a plurality of promotional items based on the user data. The computing device is further configured to determine a total profit (e.g., potential total revenue) for a combination of the plurality of items by injecting the plurality of promotional items at different positions amongst the plurality of relevant items. Additionally, the computing device is configured to present, via a user interface, the plurality of items to the user based at least in part on the total profit.

In some examples, the computing device may be further configured to determine a total profit for a plurality of combinations of the plurality of items, where each combination may include the promotional items injected at different positions amongst the relevant items. In such examples, the combination with the highest total profit may be presented to the user via the user interface.

In some embodiments, a method is provided that includes to obtaining user data associated with a user from a database. The method also includes obtaining a plurality of items based on the user data. The plurality of items may include a plurality of relevant items and a plurality of promotional items. The method further includes determining a total profit (e.g., potential total revenue) for a combination of the plurality of items by injecting the plurality of promotional items at different positions amongst the plurality of relevant items. Further, the method includes presenting, via a user interface, the plurality of items to the user based at least in part on the total profit. In some examples, the method may further include determining a total profit for a plurality of combinations of the plurality of items, where each combination may include the promotional items injected at different positions amongst the relevant items. In such examples, the combination with the highest total profit may be presented to the user via the user interface.

In yet other embodiments, a non-transitory computer readable medium has instructions stored thereon, where the instructions, when executed by at least one processor, cause a computing device to perform operations that include obtaining user data associated with a user from a database. The operations also include obtaining a plurality of items based on the user data. The plurality of items may include a plurality of relevant items and a plurality of promotional items. The operations further include determining a total profit (e.g., potential total revenue) for a combination of the plurality of items by injecting the plurality of promotional items at different positions amongst the plurality of relevant items. Further, the operations include presenting, via a user interface, the plurality of items to the user based at least in part on the total profit. In some examples, the operations also include determining a total profit for a plurality of combinations of the plurality of items, where each combination may include the promotional items injected at different positions amongst the relevant items. In such examples, the combination with the highest total profit may be presented to the user via the user interface.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
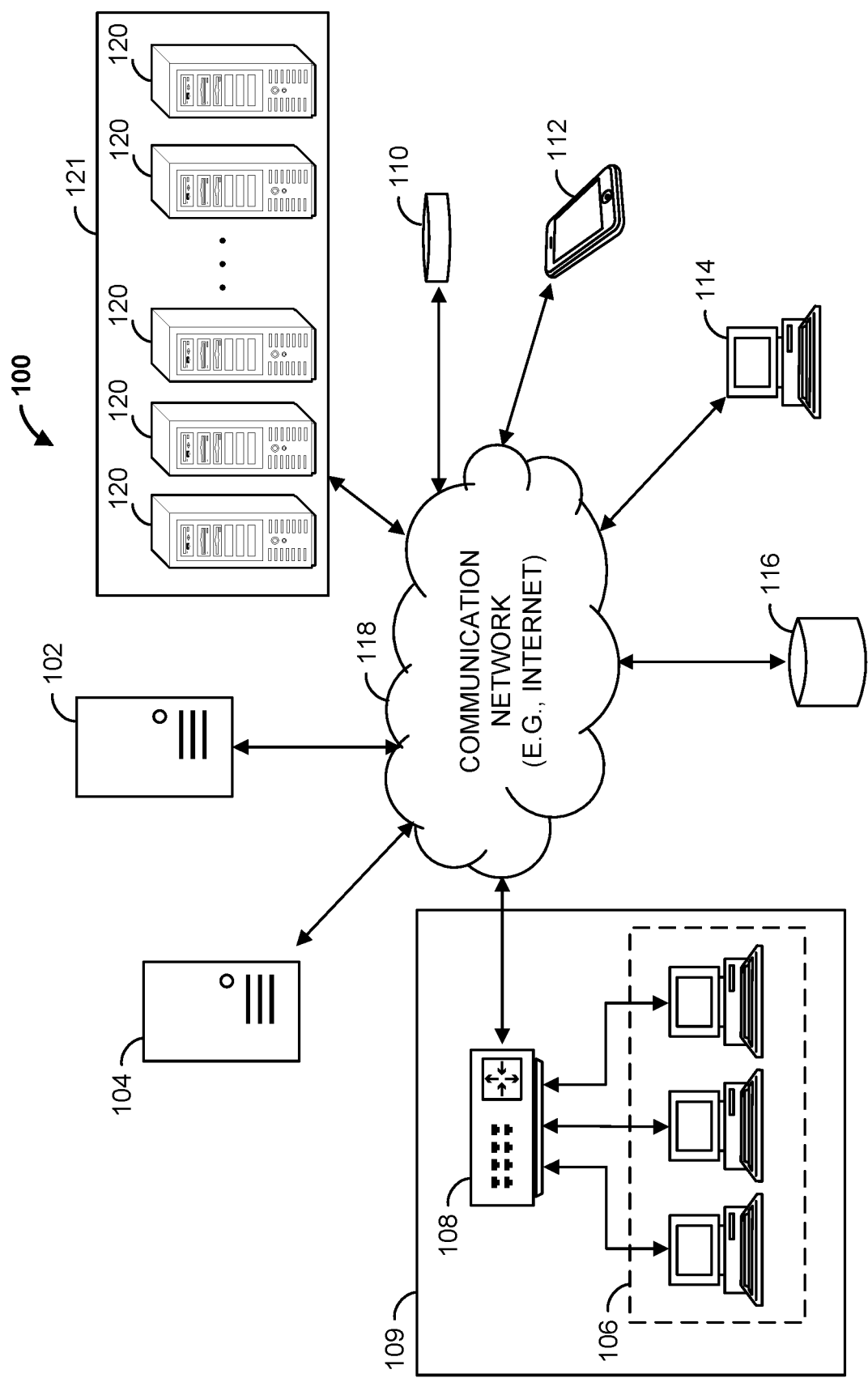
FIG. 1 is a block diagram of an item recommendation system that includes an item recommendation computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item recommendation system 100 that includes an item recommendation computing device 102 (e.g., a server, such as an application server), a web server 104, one or more processing devices 120, workstation(s) 106, database 116, and one or more customer computing devices 110, 112, 114 operatively coupled over network 118. Item recommendation computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of item recommendation computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to item recommendation computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, item recommendation computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with item recommendation computing device 102 over communication network 118. The workstation(s) 106 may send data to, and receive data from, item recommendation computing device 102. For example, the workstation(s) 106 may transmit data identifying items purchased by a customer at store 109 to item recommendation computing device 102.

Although FIG. 1 illustrates three customer computing devices 110, 112, 114, item recommendation system 100 can include any number of customer computing devices 110, 112, 114. Similarly, item recommendation system 100 can include any number of item recommendation computing devices 102, processing devices 120, workstations 106, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit user session data related to a customer's activity (e.g., interactions) on the website. For example, a customer may operate one of customer computing devices 110, 112, 114 to initiate a web browser that is directed to the website hosted by web server 104. The customer may, via the web browser, view item recommendations for items displayed on the website, and may click on item advertisements, for example. The website may capture these activities as user session data, and transmit the user session data to item recommendation computing device 102 over communication network 118. The website may also allow the operator to add one or more of the items to an online shopping cart, and allow the customer to perform a "checkout" of the shopping cart to purchase the items. In some examples, web server 104 transmits purchase data identifying items the customer has purchased from the website to item recommendation computing device 102.

In some examples, item recommendation computing device 102 may execute one or more models (e.g., algorithms), such as a machine learning model, statistical model, logarithmic model, language model, etc., to determine recommended items to advertise to the customer (i.e., item recommendations). Item recommendation computing device 102 may transmit the item recommendations to web server 104 over communication network 118, and web server 104 may display advertisements for one or more of the recommended items on the website to the customer. For example, web server 104 may display the item advertisements to the customer on a homepage, a catalog webpage, an item webpage, or a search results webpage of the website (e.g., as the customer browses those respective webpages).

In some examples, web server 104 transmits a recommendation request (e.g., search request) to item recommendation computing device 102. The recommendation request may identify a recommendation or search query provided by the customer (e.g., via a search bar of the web browser), or a recommendation query provided by a processing unit in response to user adding one or more items to cart or interacting (e.g., engaging) with one or more items. In response to receiving the request, item recommendation computing device 102 may execute the one or more processors to determine search results or recommendation results to display to the customer (i.e., item recommendations). Item recommendation computing device 102 may transmit the results to web server 104 over communication network 118. Web server 104 may display the results on a results webpage, for example.

Item recommendation computing device 102 is further operable to communicate with database 116 over communication network 118. For example, item recommendation computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to item recommendation computing device 102, in some examples, database 116 can be a local storage device, such as a hard drive, a non-volatile memory, or a USB stick. Item recommendation computing device 102 may store purchase data received from web server 104 in database 116. Item recommendation computing device 102 may also receive from web server 104 user session data identifying events associated with browsing sessions, and may store the user session data in database 116.

In some examples, item recommendation computing device 102 generates feature vectors for a plurality of models (e.g., machine learning models, statistical models, algorithms, etc.) based on item catalog data, historical user session data, purchase data, and current user session data for the user and/or items. Item recommendation computing device 102 trains the models based on their corresponding feature vectors, and item recommendation computing device 102 stores the models in a database, such as in database 116 (e.g., cloud storage).

The models, when executed by item recommendation computing device 102, allow item recommendation computing device 102 to determine item recommendations for one or more items to advertise to a customer. For example, item recommendation computing device 102 may obtain the models from database 116. Item recommendation computing device 102 may then receive, in real-time from web server 104, current user session data identifying real-time events of the customer interacting with a website (e.g., during a browsing session). In response to receiving the user session data, item recommendation computing device 102 may execute the models to determine item recommendations for items (e.g., sponsored items and non-sponsored items) to display to the customer.

In some examples, item recommendation computing device 102 receives current user session data from web server 104. The user session data may identify actions (e.g., activity) of the customer on a website. For example, the user session data may identify item impressions, item clicks, items added to an online shopping cart, conversions, click-through rates, item recommendations viewed, and/or item recommendations clicked during an ongoing browsing session (e.g., the user data identifies real-time events). Item recommendation computing device 102 may generate item recommendations based on the user session data, historical user data (e.g., historical user transaction data, historical user engagement data), active sponsored items available, potential revenues for sponsored items (e.g., cost-per-click values), potential profit margins for sponsored and non-sponsored items, item catalogs, page limits, carousel limits and/or pane limits. For example, item recommendation computing device 102 may determine relevant items for recommendation as an initial matter based on relevance of the corresponding items to the user (e.g., based on user session data, historical user data) and potential revenues corresponding to user interaction with corresponding sponsored items. The items may be ranked and/or assigned positions for display based on sponsored ads limits for a carousel, pane and page, potential revenue (e.g., total profit) from a combination of the items in different positions, etc. The item recommendation computing device 102 may then inject sponsored items (e.g., promotional items) at positions within the relevant items (e.g., relevant non-sponsored items) that provide a maximized total profit while preserving the integrity or relevancy of the recommendations.

In some examples, the tensors are generated based on semantic similarities between the items (e.g., sponsored and non-sponsored items). For example, item recommendation computing device 102 may generate the tensors based on a universal sentence encoding using a semantic similarity model that encodes and embeds item attributes such as title, brand, department, category, etc. (e.g., metadata) of the items as extracted by analyzing the catalogs for each item. For example, item recommendation computing device 102 may generate the tensors based on catalog data for all items (e.g., sponsored items, non-sponsored items) as stored in database 116.

In some examples, item recommendation computing device 102 may also generate tensors based on semantic similarities between items (e.g., sponsored items, non-sponsored items). The tensors may be used to rank and score all items based on relevancy to the user for a current user session. The initial set of items for recommendation may then determine initial profits, scores and/or ranks for the items based on the relevancy scores and cost scores (e.g., profit margin scores, cost-per-click score for each sponsored item).

Item recommendation computing device 102 may provide the tensors (e.g., embeddings) as required by each machine learning model. The machine learning models may include, for example, neural networks, deep neural networks, decision tree models, regression models, random forest models, statistical models, stochastic models, or any other suitable models.

In some examples, item recommendation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units.

Based on the output of the models, item recommendation computing device 102 may generate item recommendations for items (e.g. sponsored and non-sponsored items) to be advertised on the website. For example, item recommendation computing device 102 may transmit the item recommendations to web server 104, and web server 104 may display the recommend items to the customer.

In some examples, item recommendation computing device 102 may rank items for recommendation based on balancing the expected revenue from the items (e.g., sponsored items, non-sponsored items) and relevancy of the item recommendations. For example, the balancing may be dependent on relevancy of the item to the user, the revenue per interaction with each sponsored item, the potential profit per purchase of each item, the user session, and the position that the item is shown in the recommendations. A highly relevant item shown at a position that the user is unlikely to scroll to may not result in sale of the item.

In some examples, item recommendation computing device 102 may inject promotional items (e.g., sponsored items) within relevant items such that the contribution profit (e.g., total profit) increases without compromising on relevancy of the recommendations. Item recommendations computing device 102 may compute total profits of each potential combination of relevant items and promotional items by adding total reward (e.g., profit margin) and total contribution (e.g., cost-per-click value) for all combinations. Item recommendation computing device 102 may then select the combination with the maximal total profit as the item recommendations to present to the user. Item recommendation computing device 102 may select balance the need for selecting a correct and relevant subset of all available items and optimizing for all different possible permutations of all positions available for presenting the selected subset of items (e.g., recommended items).

Item recommendation computing device 102 may obtain a total number of recommendations (e.g., items) that can be presented to the user (e.g., page limit) and the positions within the page (or carousel, pane) to present the recommendations. Note that the total number of positions will equal the total number of recommendations (e.g., page limit, carousel limit, pane limit). As an initial matter, the item recommendation computing device 102 may determine a set of relevant items based on user data (e.g., current user session data, historical transaction data, historical user session data, etc.) including relevant items with positions (e.g., ranks) based on relevancy and/or profit margin associated with each of the relevant items. The number of relevant items in the set of relevant items may be equal to the total number of available positions (e.g., total number recommendations allowed per page, carousel, and/or pane).

Item recommendation computing device 102 may also obtain or determine a set of sponsored items from all active sponsored items (e.g., all available sponsored items at any given time). In some examples, the set of sponsored items may be selected based on relevance scores of the sponsored items in relation to the user data. In some examples, the size of the set of sponsored items may be based on sponsored item limit (e.g., total number of sponsored items allowed to be presented). The sponsored item limit may be a sponsored item page limit, sponsored item carousel limit and/or sponsored item pane limit.

In some examples, item recommendation computing device 102 may determine total profits for each combination of relevant items and set of sponsored items (hereinafter "promotional items") by injecting the promotional items at different positions within the relevant items. The total profit for a combination may be based on expected profit margin for each item at the potential position, and contribution profit for each item (e.g., zero for non-sponsored item, cost-per-click for sponsored item). For example, for sponsored item limit K in recommendation set R, and promotional items A, the number of combinations may be determined as $(C_{|A|}{}^{K})\circ(P_K{}^{|R|})$. For each combination, a total profit may be determined. The combination with the highest total profit may be presented to the user as item recommendations.

In some examples, the number of potential combinations of relevant and promotional items may be exponentially high. In such examples, item recommendation computing device 102 may apply a Deep Q-network to optimize the solution, and determine potential combinations (e.g., positions of promotional items) in the item recommendations in a feasible manner. Item recommendation computing device 102 may reduce the number of permutations to bind the solutions to K*A*R. A deep Q-network (M) with Attention may be used to generate a modified recall set (e.g., modified combination set), M(R,C,A) with smaller number of combinations.

In some examples, item recommendation computing device 102 may as an initial matter, select a promotion items from the set of promotional items randomly. Item recommendation computing device 102 may optimize which position (p) the randomly selected promotional item should occupy in the item recommendations. The optimized position (p) for the randomly selected promotional item may be determined based on a reward function. The reward function may be determined as a combination of contribution profit and relevance (i.e., a reward/potential profit gain by adding the promotional item and displacing the last relevant item). In some examples, injecting a promotional item at a position within the relevant items may include moving the relevant item previously in that position and all subsequent relevant items by one position, and removing the last relevant item in the relevant items set from the possible combination. Next, the item recommendation computing system 102 may inject the randomly selected promotional item at the optimized position (p) for the first potential combination.

Item recommendation computing device 102 may then select another promotional item from the promotional items set (e.g., the next promotional item, randomly select another promotional item) for consideration. In some examples, another promotional item may be selected based on the maximum contribution profit capability of the remaining promotional items (e.g., future reward, future profit, potential profit). The contribution profit may be determined for a promotional item is based on the sponsorship reward (e.g., cost-per-click value) and relevance of the promotional item to the user. The relevance may be a relevance score or relevance weight determined by a relevance model based on the user data.

The process may be repeated till the number of promotional items in the potential combination reaches the sponsored items limit. The total profit for the first potential combination may then be calculated based on profit margins (e.g., selling price, selling price minus buying price) of each item in the potential combination and the contribution profit of the promotional items in the first potential combination. Item recommendation computing device 102 may repeat the process K (i.e., maximum promotional items allowed to be displayed) times, each potential combination determined by starting with a different promotional item in the promotional items set.

Item recommendation computing device 102 may then select the combination with the highest total profit (e.g., potential total profit) as the item recommendations to present to the user. The item recommendation computing device 102 may provide to the web browser 104 the items in the selected combination and the associated positions for the items. Web browser 104 may the present the item recommendations to the user with the selected items in the selected positions from the selected combination with the highest profit. In this way, item recommendation computing device 102 may maximize the potential total profit while maintaining the relevancy of the recommendations in a computationally efficient manner by reducing the number of permutations required to generate the recommendations, and in turn saving computational power required to generate items recommendations.

In some examples, item recommendation computing device 102, at each new state (new determination of injecting an promotional item), may take as input a set of relevant items, R, user data (e.g., contextual data), INI, promotional items to inject (e.g., set of promotional items), position to inject a promotional item, p, window size, w, and type. The next state and the next reward for the promotional item in consideration, and best possible position for it may then be determined as follows:

If type == boost :− curr_idx = $R$.get_index(ad);  Eq. 1 if $p <$ curr_idx; $\{R[p]$ = Ad; $R_{p+1}$ −> shift_right$\}$;

else $p$ = curr_idx

If type == blend & if $p \neq 0$ :− replaced_item = $I_N$;  Eq. 2

$R$ −> $(R \backslash I_N)$; $R[p]$ = Ad; $R_{p+1}$ −> shift_right $$r\_rel\_wt = \sum_{i=0}^{N} relevance\_wt_i * profit\_margin_i * conv\_rate_i \quad \text{Eq. 3}$$

r_contribution_profit =  Eq. 4

$$\sum_{i=0}^{N} contribution\_profit_i * relevance\_wt_i * ctr_i * 1 \Big/ \left(1 + \left(\frac{i}{w}\right)\right)$$

r_rel_wt = r_rel_wt *  Eq. 5 recall_set_conv * anchor_conv * (anchor_conv / category_conv)

r_contribution_profit = r_contribution_profit * (1.0 / recall_set_ctr)  Eq. 6

Penalty = if exists a window −> more than 2  Eq. 7 ads return (−2 * (r_rel_wt + r_contribution_profit)), else 0 blend_penalty = relevance_wt$_i$ * profit_margin$_i$ *  Eq. 8 conv_rate$_i$ ** anchor_conv * (anchor_conv / category_conv);

if type == blend & if $p \neq 0$ else 0

Reward =  Eq. 9 r_rel_wt + $\alpha$ * r_contribution_profit + Penalty + blend_penalty.

(where $0 <= \alpha < 3$, controls $CP$ importance)

Return reward, R, p  Eq. 1−

Where relevance_wt is the relevance score of the item as determined using a relevance model and based on the user data, conv_rate refers to the potential revenue or cost-to-click value associated with the potential item when added to a position, i, profit_margin refers to the potential profit expected from a purchase of the potential item at position, i, and recall_set_conv refers to potential revenue associated with the relevant items set. Penalty may be added to the reward (item reward) when more than a set number of promotional items are being added to the potential combination. The determined reward refers to the overall total profit, the determined R refers to the potential combination at the new state and p refers to the best potential position determined for the promotion item in consideration for this state.

In some examples, item recommendation computing device 102 may train a machine learning model to determine the combination with the highest reward or total profit (e.g., potential total profit). In some examples, item recommendation computing device 102 may train a Deep Q-network to determine item recommendations (e.g., combination of relevant items and promotional items with maximized total profit). The model may be trained with the above defined reward policy (i.e., equations 1-10). An epsilon greedy action selection policy may also be used to train the model. In some examples, an experience relay may also be added to reduce the correlations in the training data. A mean square error may be used as the loss function to train the model. The model may be trained as a Q network action-value space based on a combinatorial space ($K^{|A|}$). ($|R|$), where $|A|$ is number of promotional items available to be selected, K is the maximum size of promotional items to be included in item recommendations set R, with $|R|$ referring to available positions for items. The model may be formulated for determining, at each state, an immediate reward (i.e., reward for injecting the potential item at a position) and a future reward (i.e., probabilistic estimate of the contribution of adding other promotional items at different positions to reach a termination state from the current state).

The item recommendations may then be generated using portion of the relevant items and portion of the promotional items in positions determined to provide a total profit higher than other combinations. The item recommendations, including the personalized set of promotional and relevant (non-promotional) items in the optimized positions may then be presented to the user.

Among other advantages, the embodiments allow for real-time inferencing of multiple models to generate item recommendations for a particular customer based on balancing the need for maximizing total revenue, meeting the maximum sponsored items constraints for a website page, and not compromising the relevancy of the recommendations for increased customer satisfaction. Distributing processing tasks prior to the current session, based on previously trained and saved embeddings, allows for more consistent throughput consistency, as well as a reduction in overall processing time. Moreover, the distribution of processing tasks allows for the use of more computationally intensive models, such as neural networks, which can capture non-linear relationships from trained data and may be better suited to estimate relationships on unseen data (e.g., real-time data).

Figure 2:
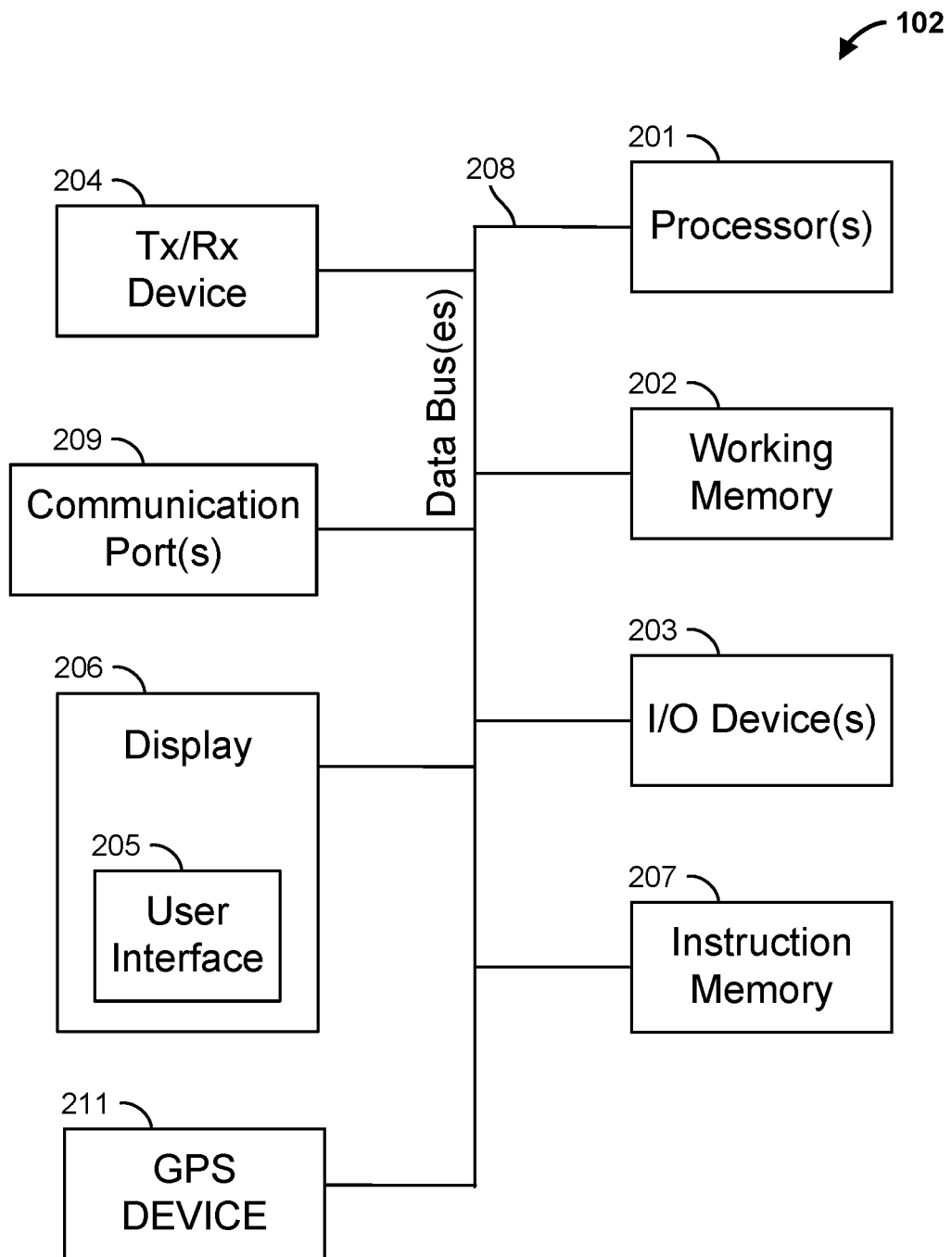
FIG. 2 is a block diagram of the item recommendation computing device of FIG. 1 in accordance with some embodiments.

FIG. 2 illustrates the item recommendation computing device 102 of FIG. 1. Item recommendation computing device 102 can include one or more processors 201, working memory 202, one or more input/output devices 203, instruction memory 207, a transceiver 204, one or more communication ports 209, a display 206 with a user interface 205, and a global positioning system (GPS) device 211, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally, processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item recommendation computing device 102. Working memory 202 can be a random-access memory (RAM) such as a static random-access memory (SRAM) or dynamic random-access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can be any suitable display, and may display user interface 205. User interfaces 205 can enable user interaction with item recommendation computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item recommendation computing device 102 will be operating in. Processor(s) 201 is operable to receive data from, or send data to, a network, such as communication network 118 of FIG. 1, via transceiver 204.

GPS device 211 may be communicatively coupled to the GPS and operable to receive position data from the GPS. For example, GPS device 211 may receive position data identifying a latitude, and longitude, from a satellite of the GPS. Based on the position data, item recommendation computing device 102 may determine a local geographical area (e.g., town, city, state, etc.) of its position. Based on the geographical area, item recommendation computing device 102 may determine relevant trend data (e.g., trend data identifying events in the geographical area).

Figure 3:
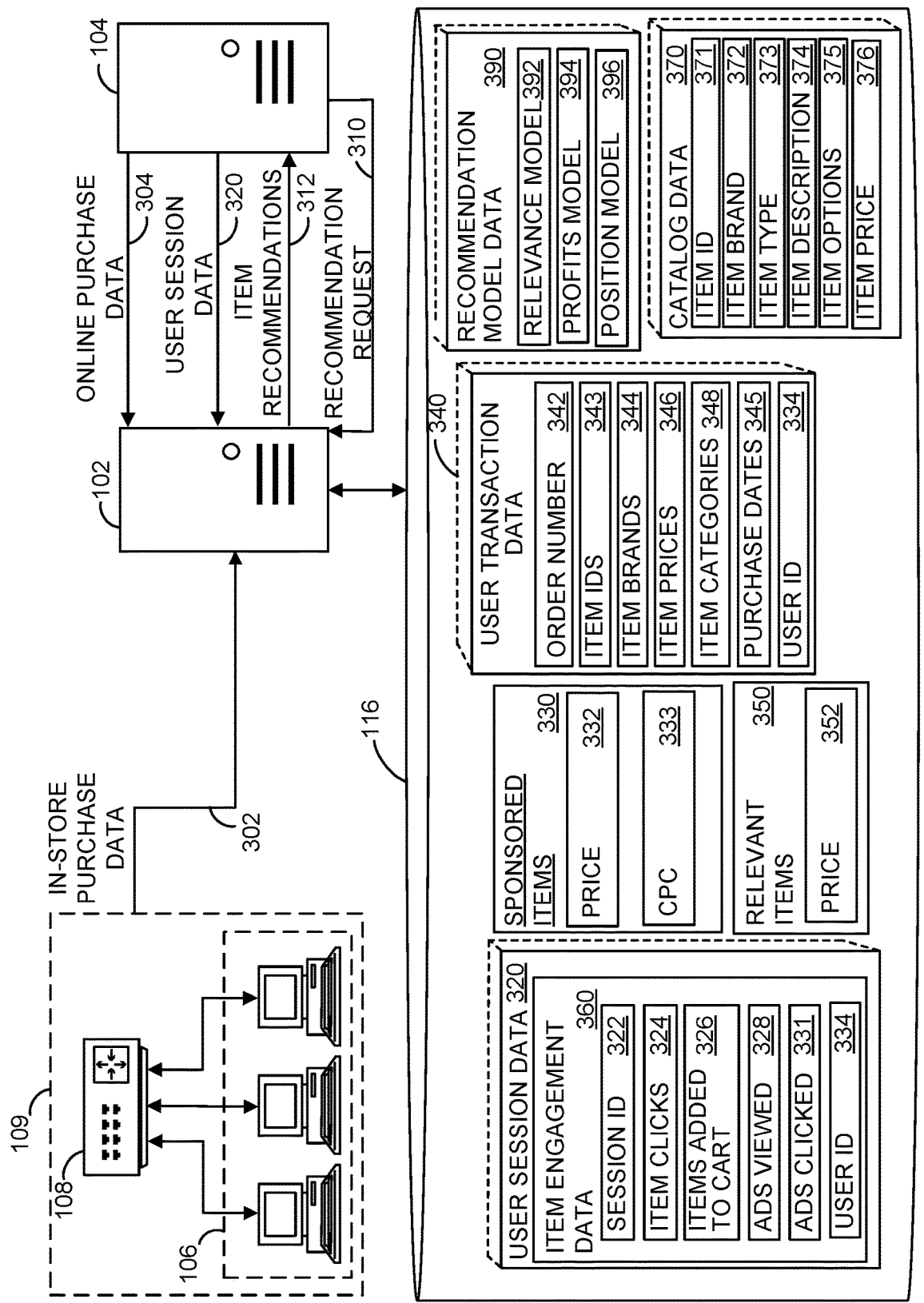
FIG. 3 is a block diagram illustrating various portions of the item recommendation system of FIG. 1 in accordance with some embodiments.

FIG. 3 is a block diagram illustrating examples of various portions of the item recommendation system 100 of FIG. 1. As indicated in the figure, item recommendation computing device 102 may receive user session data 320 from web server 104, and store user session data 320 in database 116. User session data 320 may identify, for each user (e.g., customer), data related to that user's browsing session, such as when browsing a retailer's webpage hosted by web server 104.

In this example, user session data 320 may include item engagement data 360. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

Item recommendation computing device 102 may also receive online purchase data 304 from web server 104, which identifies and characterizes one or more online purchases, such as purchases made by the user via a retailer's website hosted by web server 104. Item recommendation computing device 102 may also receive in-store purchase data 302 from store 109, which identifies and characterizes one or more in-store purchases including item identifiers and prices.

Item recommendation computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item types 348 identifying a type (e.g., category) of each item purchased, a purchase date 345 identifying the purchase date of the purchase order, and user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), item options 375 (e.g., item colors, sizes, flavors, etc.), and item price 376 (e.g., the retail price of the item).

Database 116 may also store sponsored items 330, which may identify and categorize each sponsored item (e.g., promotional item) available at the retailer's website. Sponsored items 330 may include data related to sponsored items and their corresponding cost-per-click score (e.g., sponsorship revenue, contribution score), CPC 333, indicating corresponding revenue that is earned by the retailer for every user interaction with the sponsored items, and price 332 indicting the price (e.g., retail price, profit) of the sponsored item.

Additionally, database 116 may store relevant items 350, which may identify and categorize items relevant to the customer. Each item may also be associated with corresponding price 352 and relevancy scores indicating a relevancy of the items to the particular customer. The relevant items 350 may be determined using relevance model 392 also stored in database 116. Relevance model 392 may determine relevant items 350, their corresponding price 352, and their corresponding score for the customer based on user session data 320 and/or user transaction data 340. Any known relevancy model may be used to determine the relevant items 350 and their corresponding scores for each user and/or each user session. Relevant items 350 may include data indicating a set of relevant items that are determined to be relevant to the user based on the user transactional data 340 and/or user session data 320 associated with past user sessions, as determined prior to the current user session by relevance model 392. In some examples, price 352 for each relevant item in relevant items 350 may be obtained from catalog data 370 based on item id 371 and corresponding item price 376.

Database 116 may also store recommendation model data 390 identifying and characterizing one or more machine learning models. For example, recommendation model data 390 may include the relevance model 392, a profits model 394, and a position model 396. Each of the relevance model 392, profits model 394, and position model 396 may be one or more machine learning models trained based on corresponding tensors (e.g., embedding vectors, feature vectors) generated by item recommendation computing device 102.

In some examples, item recommendation computing device 102 receives (e.g., in real-time) user session data 320 for a customer interacting with a website hosted by web server 104. In response, item recommendation computing device 102 generates item recommendations 312 identifying recommended items to advertise to the customer, and transmits item recommendation 312 to web server 104. In other examples, item recommendation computing device 102 receives a recommendation request 310 from the web browser 104 from a customer interacting with a website hosted by web browser 310. In response, item recommendation computing device 102 generates item recommendations 312 identifying recommended items to advertise to the customer, and transmits item recommendation 312 to web server 104.

For example, item recommendation computing device 102 may assign each of the relevance model 392, profits model 394, and position model 396 (or parts thereof) to a different processing unit or virtual machines hosted by one or more processing devices 120. Moreover, item recommendation computing device 102 may generate tensors based at least on the received user session data 320 (e.g., the user session data 320 received in real-time) for the customer, the user transaction data 340 (e.g., the user transaction data 340 from prior or historical user sessions), and sponsored items 330 as required by each of the relevance model 392, profits model 394, and position model 396. In some examples, item recommendation computing device 102 generates the tensors based on the received user session data 320, and one or more of the following: historical user session data 320 for the customer, historical user transaction data 340 for the customer, relevant items 350, and sponsored items 330, for each of the relevance model 392, profits model 394, and position model 396. Item recommendation computing device 102 may provide (e.g., transmit) the tensors to the processing units accordingly, and the processing units may execute the models based on the provided tensors (e.g., inferencing).

Further, item recommendation computing device 102 may obtain the output (e.g., output data, output tensors) of each of the relevance model 392, profits model 394, and position model 396 from the processing units, and generate the item recommendation 312 based on the outputs of the models. For example, item recommendation computing device 102 may use profit model 394 to manipulate the output of the relevance model 392 and the sponsored items 330 to inject the sponsored items in the relevant items 350 based on sponsored items 330 based on total profits for potential combinations of sponsored items 330 and relevant items 350 to generate the initial set of items for recommendation. The position model 396 may determine final positions for sponsored items 330 (or parts thereof) and relevant items (or parts thereof) to present to the user as item recommendations 312 based on a combination of the model outputs. The item recommendations 312 may then be generated as the combination of the model outputs.

Figure 4:
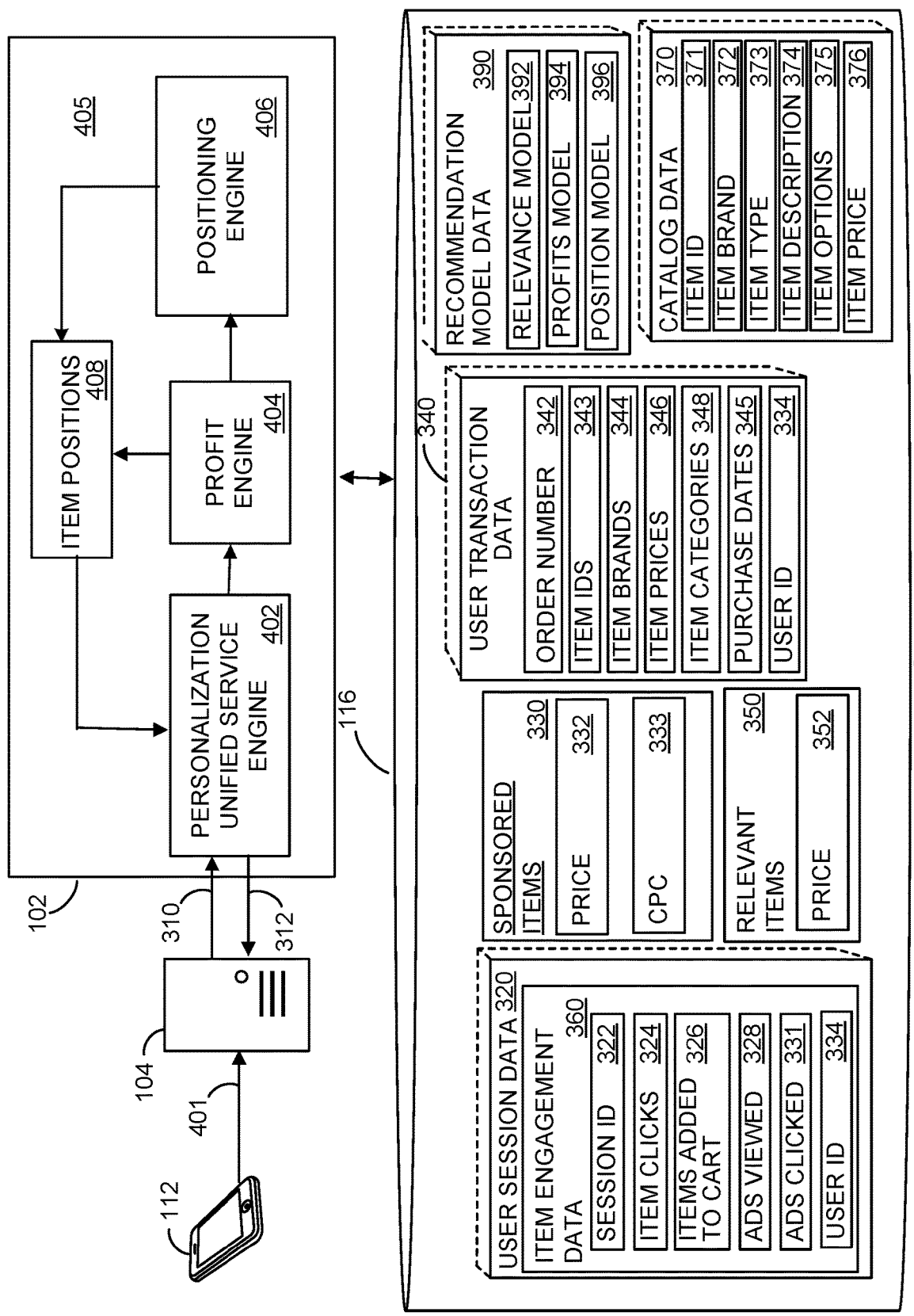
FIG. 4 is a block diagram illustrating various portions of the item recommendation computing device of FIG. 1 in accordance with some embodiments.

FIG. 4 is a block diagram illustrating a more detailed view of item recommendation computing device 102. Specifically, item recommendation computing device 102 includes FIG. 4 is a block diagram illustrating a more detailed view of item recommendation computing device 102. Specifically, item recommendation computing device 102 includes personalization unified service engine 402, profit engine 404, and positioning engine 406. In some examples, one or more of personalization unified service engine 402, profit engine 404, and positioning engine 406 are implemented in hardware. In some examples, one or more of personalization unified service engine 402, profit engine 404, and positioning engine 406 are implemented as an executable program maintained in a tangible, non-transitory memory, such as instruction memory 207 of FIG. 2, which may be executed by one or processors, such as processor 201 of FIG. 2. For example, personalization unified service engine 402 may obtain from database 116 recommendation request 310 as a message 401 from user device 112 via web server 104 and may execute recommendation model(s) included in the recommendation model data 390.

In this example, web server 104 transmits a recommendation request 310 to item recommendation computing device 102. Recommendation request 310 may include a request for item recommendations for presentation to a particular user using the user device 112. In some examples, recommendation request 310 further identifies a user (e.g., customer) for whom the item recommendations are requested at web server 104. Personalization unified service engine 402 receives recommendation request 310, and receives and parses the user session data 320 (e.g., user session data associated with a current user session of the user in real-time). Personalization unified service engine 402 provides the user session data to the profit engine 404, and positioning engine 406, and other data, which may include the user transaction data 340, user session data 320 (e.g., user session data from historical user sessions), sponsored item data 330, and relevant items 350 extracted from database 116.

Profit engine 404 can determine one or more potential combination of relevant items and sponsored items and their corresponding total potential profits based on the user session data 320, the user transaction data 340, sponsored items 330, and relevant items 350. Profit engine 404 may use relevance model 392 and the profit model 394 to determine the potential combinations for recommendation based on the user's historical purchase and/or session data for the particular user of user device 112, sponsored items 330, and relevant items 350 extracted from the database 116 for the particular user. In some examples, profit engine 404 may further use a thresholding algorithm to threshold the sponsored items included in the potential combinations to a predetermined number based on constraints on the maximum number of sponsored items that can be provided on the website page in every pane, every carousel, and/or every page. Profit engine 404 generates ranked(e.g., positions) combination of relevant and sponsored items for recommendation, identifying and characterizing items determined to be relevant to the user and including sponsored items at positions that maximizes the total profit from sponsorships and potential purchase of items while retaining the relevancy of the recommendations. Profit engine 404 may provide the potential combinations (e.g., with corresponding potential positions and total profits) to positioning engine 406.

Positioning engine 406 can determine final item recommendations 312 and item positions based on maximizing the total profit. Positioning engine 406 may select a final combination from the potential combinations of sponsored and relevant items with the highest total profit to generate the item recommendations 312. Positioning engine 406 may determine the optimal positions for the items to be recommended. Item positions 408 may be generated by positioning engine 406 for item recommendations. The item positions 406 may be positions of the items in the item recommendations as determined by the positioning engine 408 to provide maximal total potential profits.

Item positions 408 can determine an ordered list of the item recommendations 312 based on the final combination received from the positioning engine 406. Item positions 408 may generate data that identifies the order and/or positions of item recommendations 312 associated with the particular user (e.g., customer) to optimize user interactions with and user purchases of items in the recommendations while also maximizing total profit and/or revenue.

Personalization unified service engine 402 may receive the item recommendations 312 from the item positions 408 in a data format (e.g., message) acceptable by web server 104. Personalization unified service engine 402 transmits the item recommendations 312 to web server 104. Web server 104 may then update or generate item recommendations for presentation to the user via the user device 112 based on the item positions 408.

Figure 5:
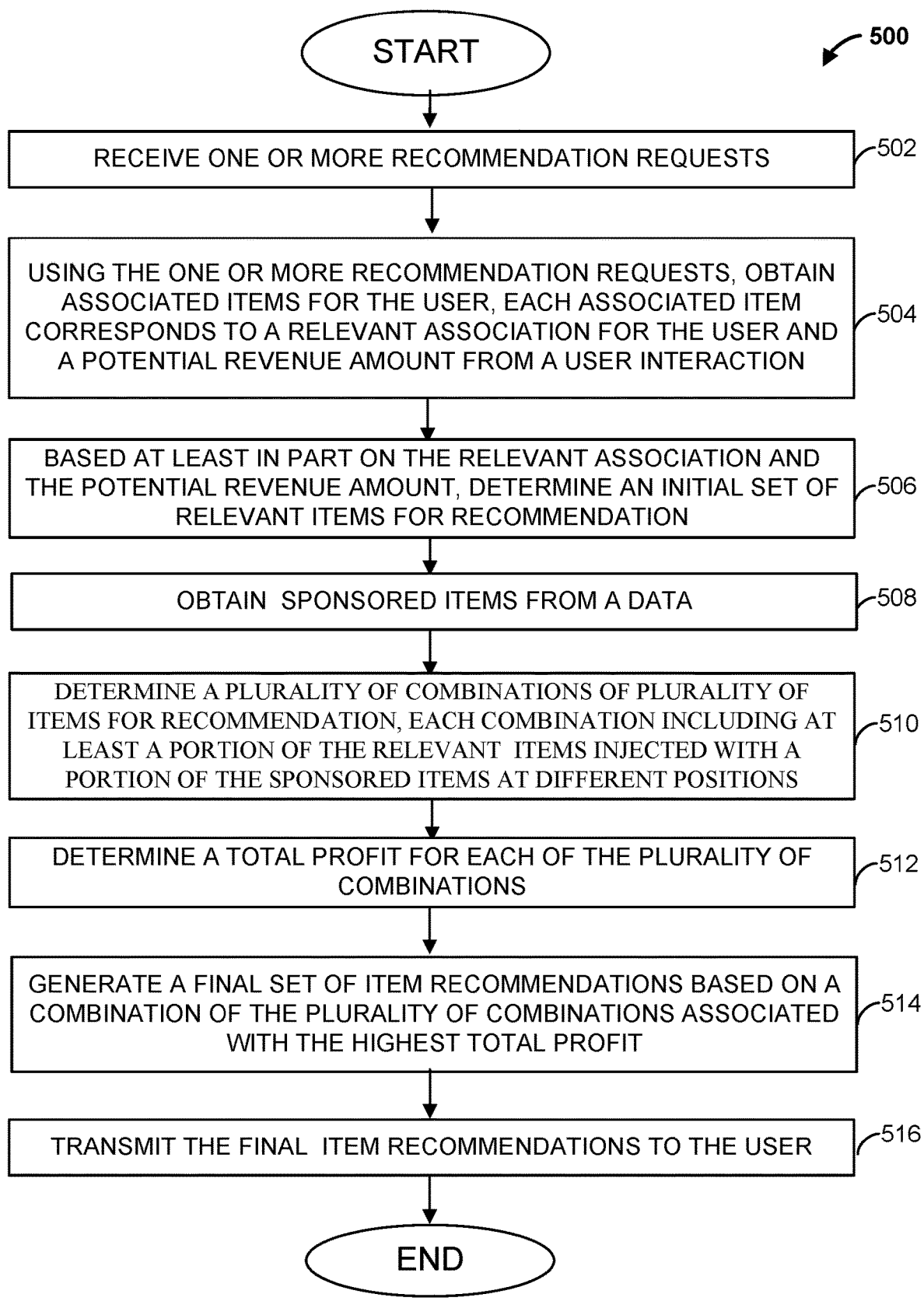
FIG. 5 is a flowchart of an example method that can be carried out by the item recommendation computing device of FIG. 1 in accordance with some embodiments.

FIG. 5 is a flowchart of an example 500 that can be carried out by the item recommendation system 100 of FIG. 1. Beginning at step 502, one or more recommendation requests are received related to a user. For example, item recommendation computing device 102 may receive a recommendation request 310 from web server 104. At step 504, associated items are obtained for the user using the one or more recommendation requests. Each associated item corresponds to a relevant association for the user and a potential revenue amount from a user interaction. For example, relevant items 350 are obtained from database 116. The relevant items 350 may include sponsored items and non-sponsored items, each relevant item may have a corresponding relevant association (e.g., relevant to the user) for the user.

At step 506, an initial set of relevant items for recommendation is determined based at least in part the relevant association and the potential revenue amount. For example, profit engine 404 may determine an initial set of items based on relevant items 350 and sponsored item data 330 (e.g., cost scores associated with sponsored items). At step 508, one or more sponsored items are obtained from the database. For example, item recommendation computing device 102 may obtain sponsored item data 330 from database 116.

At step 510, a plurality of combinations of plurality of items for recommendation is determined. Each combination includes at least a portion of the relevant items injected with a portion of the sponsored items at different positions. For example, item recommendation computing device 102 may determine a plurality of combinations of the plurality of items by injecting sponsored items within the relevant items using the profit engine 404. At step 512, a total profit is determined for each of the plurality of combinations. For example, profit model 396 may determine a total profits for each combination of relevant items and sponsored items.

At step 514, a final set of item recommendations may be generated based on a combination of the plurality of combinations associated with the highest total profit. For example, positioning engine 406 may generate item recommendations 312 based on item positions 408 determined based on a combination of the relevant items and the sponsored items with the highest total profit.

At step 516, the final set of item recommendations are transmitted to the user. For example, item recommendation computing device 102 may transmit the item recommendations 312 to web server 104 for presentation to the user via user device 112. The method then ends.

Figure 6:
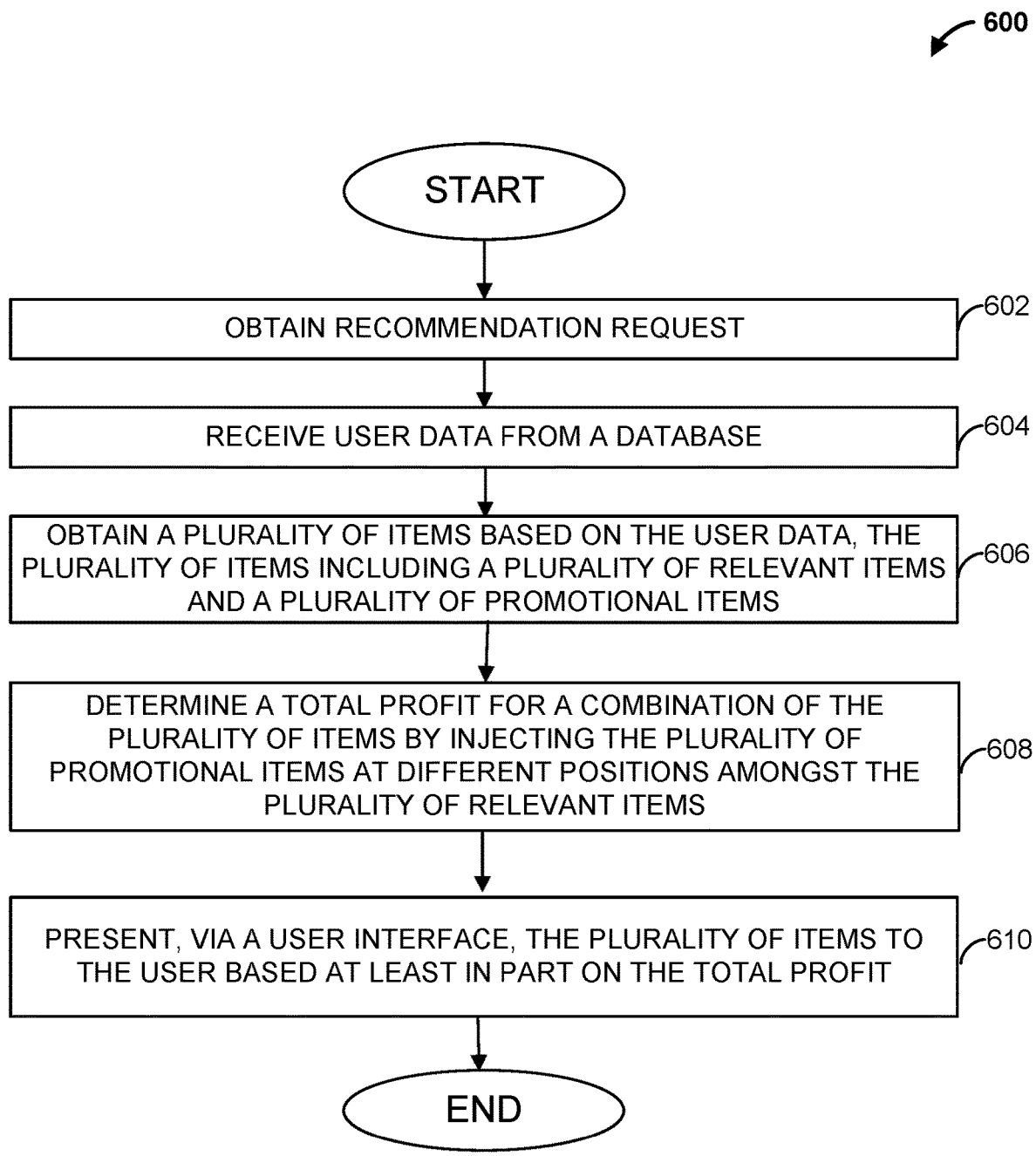
FIG. 6 is a flowchart of another example method that can be carried out by the item recommendation computing device of FIG. 1 in accordance with some embodiments.

FIG. 6 is a flowchart of an example method 600 that can be carried out by the digital item recommendation system 100 of FIG. 1. At step 602, a computing device, such as item recommendation computing device 102, receives a recommendation request. For example, item recommendation computing device 102 may receive a recommendation request 310 from web server 104. At step 604, user data is received from a database. For example, item recommendation computing device 102 may obtain the user session data and/or user transaction data for the user from database 116, which stores user session data 320 and user transaction data 340 for a plurality of users.

Proceeding to step 606, a plurality of items are obtained based on the user data. The plurality of items include a plurality of relevant items and a plurality of promotional items. For example, a plurality of items for recommendation may be received from the database 112 based on the user data (e.g., user session data 320, user transaction data 340). The plurality of items for recommendation may include relevant items 350 and sponsored items 330.

At step 608, a total profit for a combination of the plurality of items is determined by injecting the plurality of promotional items at different positions amongst the plurality of relevant items. For example, recommendation items 350 for the user along with their ranks and/or positions and total profits may be determined by profit model 394.

At step 610, the plurality of items are presented to the user, via a user interface, based at least in part on the total profit. For example, position model 396 may generate item recommendations 312 for presentation to the user based on the total profits. Item recommendation computing device 102 may transmit the item recommendations 312 to web server 104 for presentation to the user via user device 112. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
obtain user data associated with a user from a database;
obtain a plurality of items based on the user data, the plurality of items including a plurality of relevant items and a plurality of promotional items, wherein each of the relevant items includes an associated relevancy score;
determine a page limit and a number of positions within a page including a number of carousels or panes, for a user interface;
obtain session data for a current session associated with the user;
generate a set of tensors representative of each of the plurality of items, the user data, the session data, and the associated relevancy score for each of the relevant items;
a implement a Deep Q-network configured to receive a first subset of the set of tensors, wherein the Deep Q-network is configured to generate one or more combinations of the plurality of items by injecting the plurality of promotional items at different positions amongst the plurality of relevant items, according to the page limit and the number of positions, wherein the Deep Q-network is configured to maximize a profit function that assigns an expected profit margin for each item at a position in the user interface and a contribution profit for each item, wherein the Deep Q-network is configured to maintain relevancy of each of the one or more combinations of the plurality of items, and wherein each of the one or more combinations of the plurality of items comprises a subset of the plurality of items;
select a selected set of items from the one of the one or more combinations of the plurality of items, wherein the selected set of items is selected by a position model configured to receive a second subset of the set of tensors and an output of the Deep Q-network;
present, via the user interface displayed on a display, the selected set of items to the user; and
refine a machine learning model based on the selected set of items wherein the machine learning model is refined using an experience relay to reduce correlations and a mean square error loss function, wherein the machine learning module is configured to generate the plurality of relevant items and the plurality of promotional items.

2. The system of claim 1, wherein each of the one or more combinations of the plurality of items includes at least one of the plurality of promotional items at a potential position different from a position in each of a remainder of the one or more the combinations.

3. The system of claim 1, wherein the selected set of items is selected from the one or more combinations based on a total profit associated with the one or more combinations.

4. The system of claim 1, wherein computing device is further configured to:
for each of the one or more combinations of the plurality of items, determine a potential total profit; and
select the selected set of items from the one or more combinations based on the selected set of items corresponding to the highest potential total profit.

5. The system of claim 1, wherein a total profit associated with the selected set of items is determined further based on a cost-per-click ratio associated with each promotional item of the plurality of promotional items.

6. The system of claim 5, wherein the total profit associated with the selected set of items is determined further based on retail price of each item of the plurality of items.

7. The system of claim 5, wherein the total profit associated with the selected set of items is determined further based on a conversion value associated with each sponsored item of the plurality of promotional items.

8. The system of claim 1, wherein the selected set of items of the plurality of items is determined based at least in part on relevancy scores and profit margins associated with each of the items in the plurality of items.

9. A method comprising:
obtaining user data associated with a user from a database;
obtaining a plurality of items based on the user data, the plurality of items including a plurality of relevant items and a plurality of promotional items, wherein each of the relevant items includes an associated relevancy score;
determining a page limit and a number of positions within a page including a number of carousels or panes, for a user interface;
obtaining session data for a current session associated with the user;
generating a set of tensors representative of each of the plurality of items, the user data, the session data, and the associated relevancy score for each of the relevant items;
implementing a Deep Q-network configured to receive a first subset of the set of tensors, wherein the Deep Q-network is configured to generate one or more combinations of the plurality of items by injecting the plurality of promotional items at different positions amongst the plurality of relevant items, according to the page limit and the number of positions, wherein the Deep Q-network is configured to maximize a profit function that assigns an expected profit margin for each item at a position in the user interface and a contribution profit for each item, wherein the Deep Q-network is configured to maintain relevancy of each of the one or more combinations of the plurality of items, and wherein each of the one or more combinations of the plurality of items comprises a subset of the plurality of items;
selecting a selected set of items from the one of the one or more combinations of the plurality of items, wherein the selected set of items is selected by a position model configured to receive a second subset of the tensors representative of the plurality of items, the user data, the session data, and the associated relevancy score and an output of the Deep Q-network;
presenting, via the user interface displayed on a display, selected set of items to the user; and
refining a machine learning model based on the selected set of items, wherein the machine learning model is refined using an experience relay to reduce correlations and a mean square error loss function, wherein the machine learning module is configured to generate the plurality of relevant items and the plurality of promotional items.

10. The method of claim 9, wherein each of the one or more combinations of the plurality of items includes at least one of the plurality of promotional items at a potential position different from a position in each of a remainder of the one or more combinations.

11. The method of claim 9, wherein the selected set of items is selected from the one or more combinations based on a total profit associated with the one or more combinations.

12. The method of claim 9, the method further comprising:
for each of the one or more combinations of the plurality of items, determining a potential total profit; and
selecting the selected set of items from the one or more combinations based on the selected set of items corresponding to the highest potential total profit.

13. The method of claim 9, wherein a total profit associated with the selected set of items is determined further based on a cost-per-click ratio associated with each promotional item of the plurality of promotional items.

14. The method of claim 13, wherein the total profit associated with the selected set of items is determined further based on retail price of each item of the plurality of items.

15. The method of claim 13, wherein the total profit associated with the combination is determined further based on a conversion value associated with each sponsored item of the plurality of promotional items.

16. The method of claim 9, wherein the selected set of items of the plurality of items is determined based at least in part on relevancy scores and profit margins associated with each of the items in the plurality of items.

17. A non-transitory computer readable medium having instructions stored thereon, wherein the instructions, when executed by at least one processor, cause a device to perform operations comprising:
obtaining user data associated with a user from a database;
obtaining a plurality of items based on the user data, the plurality of items including a plurality of relevant items and a plurality of promotional items, wherein each of the relevant items includes an associated relevancy score;
determining a page limit and a number of positions within a page including a number of carousels or panes, for a user interface;
obtaining session data for a current session associated with the user;

generating a set of tensors representative of each of the plurality of items, the user data, the session data, and the associated relevancy score for each of the relevant items;

implementing a Deep Q-network configured to receive a first subset of the set of tensors, wherein the Deep Q-network is configured to generate one or more combinations of the plurality of items by injecting the plurality of promotional items at different positions amongst the plurality of relevant items, according to the page limit and the number of positions, wherein the Deep Q-network is configured to maximize a profit function that assigns an expected profit margin for each item at a position in the user interface and a contribution profit for each item, wherein the Deep Q-network is configured to maintain relevancy of each of the one or more combinations of the plurality of items, and wherein each of the one or more combinations of the plurality of items comprises a subset of the plurality of items;

selecting a selected set of items from the one of the one or more combinations of the plurality of items, wherein the selected set of items is selected by a position model configured to receive a second subset of the tensors representative of the plurality of items, the user data, the session data, and the associated relevancy score and an output of the Deep Q-network;

presenting, via the user interface displayed on a display, the selected set of items to the user; and refining a machine learning model based on the selected set of items, wherein the machine learning model is refined using an experience relay to reduce correlations and a mean square error loss function, wherein the machine learning module is configured to generate the plurality of relevant items and the plurality of promotional items.

18. The non-transitory computer readable medium of claim 17, each of the one or more combinations of the plurality of items includes at least one of the plurality of promotional items at a potential position different from a position in each of a remainder of the one or more the combinations.

19. The non-transitory computer readable medium of claim 17, selected set of items is selected from the one or more combinations based on a total profit associated with the one or more combinations.

20. The non-transitory computer readable medium of claim 17, the operations further comprising:

for each of the one or more combinations of the plurality of items, determining a potential total profit; and selecting the selected set of items from the plurality of potential one or more combinations based on the selected set of items corresponding to the highest potential total profit.

* * * * *